Nov. 27, 1962   G. J. CARLSON ET AL   3,066,127
POLYMERIZATION PROCESS
Filed Sept. 30, 1959
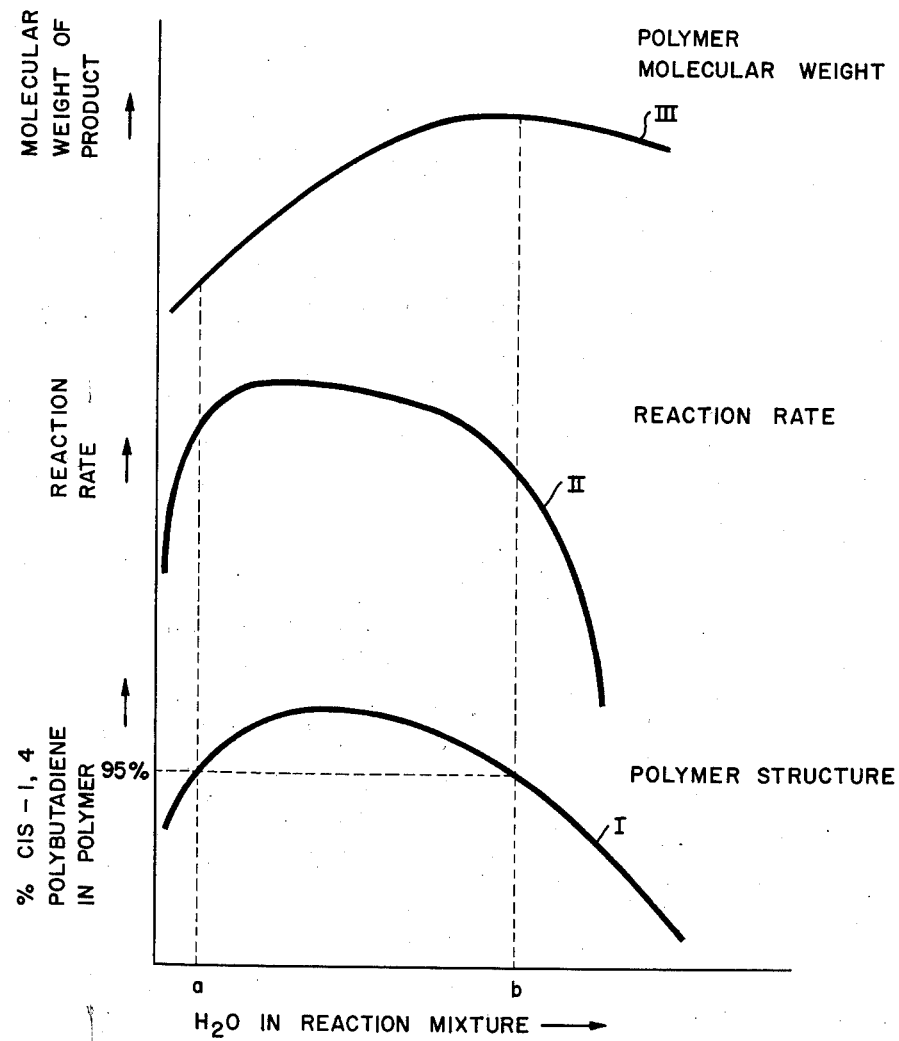
INVENTORS:
GEORGE J. CARLSON
WALTER DONG
THAIR L. HIGGINS
CHARLES H. WILCOXEN JR.
BY:
THEIR ATTORNEY

United States Patent Office 3,066,127
Patented Nov. 27, 1962

3,066,127
POLYMERIZATION PROCESS
George J. Carlson, Berkeley, Walter Dong, San Francisco, Thair L. Higgins, El Cerrito, and Charles H. Wilcoxen, Jr., San Lorenzo, Calif., assignors to Shell Oil Company, a corporation of Delaware
Filed Sept. 30, 1959, Ser. No. 843,540
12 Claims. (Cl. 260—94.3)

This invention relates to the polymerization of diolefins. More particularly, it relates to improved processes for the polymerization of butadiene.

Workers in the art have recently been successful in polymerizing 1,3-butadiene under conditions which permit the monomer to polymerize to polybutadiene containing a very high proportion, e.g., above 95%, of the cis-1,4 polymer structure. It has been found that polymers having this composition can be cured to very useful rubbers which may be employed with advantage in many commercial applications including the manufacture of tires. These novel synthetic rubbers are superior to natural rubber in resilience, low temperature flexibility, set and abrasion resistance.

Small differences in cis-1,4 content above 95% are very important in improving the crystallinity, and hence the commercial acceptability, of such synthetic rubbers.

It is known that the crystallinity of a polymer increases significantly with its regularity, and it is believed that the primary strength properties of rubbery polymers, such as tensile strength, tear resistance, cut growth resistance and the like, improve with increasing crystallinity. The primary strength properties are important to the practical utility of such polymers. The improvements resulting from very high crystallinity are most important for the practical utility of both gum and reinforced vulcanizates, particularly at elevated temperatures. They also tend to improve milling characteristics of the polymer. The significance of small differences in cis-1,4 contents above 95% is apparent from the following relationships. A polymer of 95% cis-1,4 structure consists of molecules in which 95 out of every 100 $C_4$ units are linked in cis-1,4 linkages. On the average, therefore, chains of 19 $C_4$ units are linked therein in uninterrupted cis-1,4 fashion and these chains are connected by a trans-1,4 or a 1,2-linkage. With increasing cis-1,4 content, average unit length increases greatly; it is, for example, 24 $C_4$ units at 96%, and 49 units at 98%.

One of the advantage of this invention is that it permits the production of polybutadienes of exceptionally high cis-1,4 content in reproducible fashion.

It has been found that polybutadiene of high cis-1,4 content, produced with the catalysts described below, tends to have a molecular weight which is so high that the polymer is difficult to mill. A measurement generally employed as an indication of molecular weight is intrinsic viscosity (IV), determined in toluene at 25° C., expressed in deciliters per gram (dl./g.). The most desirable IV for commercially useful cis-1,4 polybutadiene is between 2 and 3, most preferably between 2 and 2.5. Values between 1 and 3 and even up to 5 may be acceptable. One of the advantages of this invention is that it aids in securing desired values of intrinsic viscosity.

In recent work leading to the production of polybutadiene having above 95% cis-1,4 structure, it was found that such polymers can be produced by polymerizing butadiene-1,3 in a non-aqueous solution containing as essential catalytic ingredient a compound of cobalt or nickel. Certain systems of these catalysts with particular co-catalysts have been developed which have led to particularly desirable results. These systems are described in more detail below and the present invention is applicable to them. It was also found, however, that the control of butadiene polymerization with such catalytic systems is often quite difficult. In many instances runs were repeated at conditions in which all measured quantities were essentially identical and nevertheless substantial variations were found in the degree of conversion of butadiene which was obtained in a reasonable period of time as well as in the cis-1,4 content and intrinsic viscosity of the resulting products. It was attempted to overcome these difficulties by purifying the feed stocks, solvents and catalyst ingredients to remove all foreign components, including polar compounds, oxygen, water and more highly unsaturated compounds and the like which could lead to erratic results, but without consistent success.

Surprisingly, it has now been found that trace quantities of water exert an extremely important controlling effect on the above-described polymerization reactions. By carefully controlling the amount of water present in the reaction system one can obtain superior results, including increased overall reaction rates, molecular weight control and reproducible substantial increases in content of cis-1,4 structure of the resulting polymer. The precise concentration of water which gives the best results varies, generally in the range between 1 and 50 parts per million, based on the total reactants. It depends on many factors, including the particular apparatus, reactants, catalysts, diluents and contaminants present. In a preferred catalyst system, in which the catalyst is a reaction product of cobalt chloride, aluminum chloride and an aluminum alkyl compound and in which the hydrocarbon solvent is benzene, the concentration of water required for best results is generally in the range between 2 and 15 parts per million based on the total reaction mixture. In a second preferred system in which the catalyst is the same but the solvent contains both benzene and n-butene, the range for best results is generally between 2 and 30 parts per million.

It is accordingly an object of this invention to provide an improved method for the polymerization of butadiene by means of catalysts which contain compounds of cobalt or nickel as their essential ingredients. It is another object of this invention to provide a method for modifying a cobalt or nickel-containing polymerization catalyst to increase its effectiveness in the cis-1,4 polymerization of butadiene. It is a further object to provide a method which permits controlling the polymerization of butadiene to produce at a relatively high rate a product having at least 95% and preferably at least 96% cis-1,4 structure and an intrinsic viscosity in the range between 2 and 3. Other objects will become apparent from the following description of the invention.

Briefly stated, this invention is a process for polymerizing butadiene-1,3 in a non-aqueous solution containing as essential catalytic ingredient a compound of cobalt or nickel in its divalent state while controlling the total amount of water present in the reaction mixture to a predetermined value which is generally in the range from about 2 to about 50 parts per million of the mixture. More specifically, the process comprises polymerizing 1,3-butadiene at a temperature in the range from −40 to 150° C. in a hydrocarbon solution containing as essential catalytic ingredient a compound of nickel or cobalt in its divalent state while controlling the total amount of water present in the reaction mixture to remain within a range which is effective to modify the catalytic properties of the solution to maintain a relatively high overall polymerization reaction rate and a polymerization reaction which results in a cis-1,4 content of the polybutadiene substantially in excess of that obtained by employing a reaction mixture containing either a substantially lower or a substantially higher proportion of water.

As stated hereinbefore it had been found in studies of the cobalt or nickel catalyzed polymerization of butadiene that results of runs carried out under essentially identical conditions often were quite inconsistent. Among other measures to overcome this difficulty, steps were taken to provide extremely careful control of the amount of water present in the mixtures. It was generally assumed that water is a harmful ingredient in these mixtures and that it should be removed from all feed stocks, solvents and other reaction components. It was, therefore, surprising that when extremely dry reaction systems were eventually obtained in which the amount of water in the total reaction mixture dropped to as low as 1 or 2 parts per million of water or less, worse results were obtained than with higher water contents. With such very low amounts of water present the overall reaction rate decreased substantially, resulting in much less butadiene conversion in a given period of time in a given system. At the same time the cis-1,4 content of the polybutadiene product dropped to values as low as 92% or less. Further careful studies subsequently developed that it is essential for best results to maintain the amount of water in the total reaction mixture in a pre-determined narrow range. In many instances it was found that the upper and lower limit of the water concentration range in which desirable results are obtained differ only by as little as 4 to 6 parts per million, based on the total reaction mixture, whereas in other instances the limits of the range may differ by as much as 20 to 30 parts per million. In any event, it was found that when the amount of water was substantially more or substantially less than the optimum range satisfactory cis-1,4 polybutadiene was not produced at a satisfactory rate.

The sole FIGURE of the drawing is a qualitative illustration of the effect of trace amounts of water in the stereospecific polymerization of butadiene.

Curve I illustrates the effect of water on cis-1,4 content of the polymer. The amount of water which secures cis-1,4 contents above 95% is in the range between points $a$ and $b$ on the abscissa. In most cases, $b$ minus $a$ is 4 to 20 p.p.m.

Curve II illustrates the effect of water concentration on the overall reaction rate. The shape of this curve is quite similar to Curve I, and here, again, the rates between points $a$ and $b$ are satisfactory.

Curve III illustrates the effect of water concentration on the molecular weight of the product, as indicated by intrinsic viscosity. The change in intrinsic viscosity between points $a$ and $b$ may be 2 to 3 dl./g. Many factors affect this property and there may be some scatter of points above and below the trend line, even in a single series of runs.

Changes in reaction conditions, reactants, contaminants present and the like may affect the above relationships by displacing the location of the curves from the origin along the $x$-axis or by changing the numerical scale along the $x$-axis. This does not destroy the basic relationships involved.

It should be understood that the amount of water which is effective in the process of this invention is less than is found in many quite carefully dried industrial reaction systems. Two to 50 parts per million is the same as 0.0002 to 0.005 percent by weight. Thus, even with the maximum tolerable amount of water present, the reaction mixtures are still substantially anhydrous.

It should also be understood that when the required amount of water has been added according to this invention it may react in part or in whole with ingredients of the reaction mixture and will not necessarily be identifiable in the mixture by known analytical methods. Nevertheless, it has been clearly established that some water must enter the above described reaction mixture in order to achieve the desired rates, cis-1,4 contents and intrinsic viscosities.

When reference is made, therfore, to "water present in the reaction mixture" or the like, this includes all the water which is available to interact with the catalyst during the polymerization, either by entering the reaction mixture dissolved in a reactant or diluent stream or loosely bound or complexed with a reactant or solvent, or by being taken up from incompletely dried equipment, or from other sources. The exact nature of the interaction between water and catalyst is not yet known, but the results of numerous experiments have clearly demonstrated that there is an interaction which affects the overall reaction rate and the structure and molecular weight of the resulting polymer.

It is difficult to make precise analyses for water in concentrations of the order of 10 parts per million or less. The well known Karl Fischer method appears to be the best available, but it has been found that even when the Karl Fischer analysis for water is negative water may still be present, e.g., in amounts of 1 to 2 parts per million. It is, therefore, not usually possible to state the amount of water present in a given system with certainty to 1 or 2 parts per million, but it is possible to know with certainty when 1 or 2 parts of water per million parts of reaction mixture is added, for example by means of adding a fixed amount of a solution of water in benzene having a measured, relatively high water concentration, e.g., of 50 or more parts per million.

The polymerization of butadiene according to this invention is carried out in solution with a suitable non-aqueous diluent. Aromatic hydrocarbons are preferred diluents. Other cyclic hydrocarbons, particularly hydroaromatics, may be substituted in whole or in part for the aromatic hydrocarbons. Good results are also obtained with mixtures of liquid hydrocarbons wherein only a portion is an aromatic or cyclic hydrocarbon. The use of benzene as sole diluent is a particularly preferred embodiment in the polymerization of butadiene with the preferred catalysts of this invention. Other cyclic hydrocarbons that may be employed as diluents include toluene, decalin, mestylene, ethyl benzene and other normally liquid cyclic compounds. Suitable hydroaromatic diluents include cyclohexane and alkyl substituted cyclohexanes. Aliphatic hydrocarbons which may be employed as diluents together with a cyclic hydrocarbon include hexane, octane, isooctane and the like. Olefins, e.g., butene-1, butene-2, pentenes, hexenes and the like, are also suitable diluents when using the preferred catalysts.

When mixed hydrocarbon diluents are employed, best results are obtained when an aromatic is present. The amount of benzene or other aromatic hydrocarbon present with an aliphatic diluent should be sufficient to permit the resulting polybutadiene to remain in solution in the liquid reaction mixture. This is readily determined in each instance and varies with the amount of butadiene charged, the temperature and the individual aliphatic solvent. For example, with butene as solvent, 8 to 10% benzene is generally sufficient. Saturated $C_4$ diluents may require admixture of 25 to 35% of benzene.

The concentration of butadiene in the reaction mixture is suitably up to about 25% by weight or more. Variations within this range may affect the molecular weight of the polymer. At relatively low concentrations of butadiene the viscosity of the polymer solution and the molecular weight of the polymer will be relatively lower.

The essential catalytic compounds of this invention are compounds of divalent cobalt or nickel. Most preferred as catalyst is cobalt chloride. Other preferred catalysts are nickel chloride and other halides of cobalt and nickel. Next preferred are nitrates of cobalt and nickel. Soluble organic compounds of cobalt and nickel, such as cobalt or nickel naphthenates, octanoates or others may be employed. Other compounds which may be employed are the cobalt or nickel salts of oxygenated inorganic acids such as sulfates, phosphates, nitrates and carbonates; sulfides, cyanides and sulfocyanides and salts of organic acids such as acetates, propionates, butyrates, oxalates and benzoates.

The cobalt and nickel compounds are used in certain combinations with other ingredients which modify the action of the catalyst and may be designated "co-catalysts." The following combinations of ingredients provide particularly outstanding results: (a) a cobalt or nickel salt in combination with an acidic metal halide; (b) a cobalt or nickel salt in combination with an acidic metal halide and an aluminum alkyl compound; and (c) a cobalt or nickel compound in combination with an organo-aluminum compound.

Of the acidic metal halides, aluminum halides are preferred. Aluminum chloride is particularly preferred, followed by aluminum bromide and the other aluminum halides. Resublimed aluminum chloride is particularly outstanding for the production of cis-1,4 polymer of conjugated dienes but represents an unnecessarily pure form of the halide. Other acidic metal halides that may be used in this invention include those of gallium, indium, zinc and other non-transition metals, with the chlorides thereof being best. Acidic metal halides herein means those halides which are Lewis acids, as defined, for example, in "Advanced Organic Chemistry" by G. M. Wheland, John Wiley and Sons, 1949, pages 80 et seq.

The organo-aluminum compounds employed in combination (c) may be any aluminum compounds having an organo radical. However, aluminum alkyls are preferred. The aluminum alkyls useful in combinations (b) and (c) include trialkyl aluminum, alkyl aluminum halides and alkyl aluminum hydrides. Representative alkyl aluminums include those represented by the formulas $AlR_3$ and $Al_aR_bX_c$. In these formulae, R may be the same or different alkyl radicals of 1 to 10 carbon atoms such as methyl, ethyl, propyl, isopropyl, n-butyl, isobutyl, octyl, nonyl and the like. In the preferred embodiment the R's are lower alkyls having from 1 to 4 carbon atoms, with ethyl being particularly preferred. X is hydrogen or a halogen, preferably chlorine. The value of $a$ is 1 or 2. The values $a$, $b$ and $c$ are related so that $$3a = b + c$$

Included are, for example, aluminum triethyl, aluminum triisopropyl, aluminum tributyl, aluminum trisobutyl, aluminum isobutyl sesquihalide, aluminum diethyl hydride, aluminum butyl dichloride, aluminum ethyl dichloride, aluminum diethyl chloride and the like. The aluminum alkyl sesquihalides are preferred and among them the species aluminum ethyl sesquichloride $$(Al_2Et_3Cl_3)$$

is preferred.

In modification (a) in which the catalyst consists of a cobalt or nickel salt and an acidic metal halide the catalyst is prepared as a complex of the two ingredients. These catalysts are very simple to prepare. In essence, all that is required is that the catalyst components be mixed in a hydrocarbon diluent and the complex be permitted to form. Preferably the hydrocarbon diluent for the monomer and the catalyst preparation should be the same and accordingly benzene or benzene-containing mixtures are preferred for the catalyst preparation. The catalyst formation is hastened if the hydrocarbon diluent containing the catalyst components is refluxed for a period ranging from a few minutes to a few hours. Alternatively, the catalyst may be permitted to form from the components by merely allowing the mixture to stand for several hours. Best results are obtained when the maximum amounts of the catalyst components react and go into solution in the hydrocarbon diluent. In the most preferred embodiment the catalyst components are added to the hydrocarbon diluent, the mixture is heated and thereafter the excess solids are removed by filtering, centrifuging or decanting. The catalyst is then in a soluble form which is contained in the hydrocarbon diluent. In the referred preparations of this type of catalyst, the mol ratio of the acidic metal halide to the transition metal halide during the catalyst preparation is greater than that in the final catalyst. The preferred mol ratios in the final catalyst include a two to five fold molar excess of acidic metal halide over cobalt or nickel salt. The amount of cobalt or nickel in solution may be in the order of 5 to 2,000 parts per million. For practical reasons it is generally preferred to employ a solution which is substantially saturated with respect to cobalt or nickel.

In the preparation of the catalysts of type (b), which include cobalt or nickel salt, an acidic metal halide and an alkyl aluminum compound, the catalyst may be simply prepared by mixing the catalyst components in a hydrocarbon diluent and permitting the reaction product to form. The remarks made above with respect to the formation of a two-component catalyst also apply to the preparation of such a three-component catalyst. Another technique for the preparation of the three-component catalyst comprises proceeding as above but excluding the alkyl aluminum initially. After the two inorganic components have been heated in the hydrocarbon diluent and the solid separated, the alkyl aluminum component, which is normally a liquid, is added to yield the reaction product. The solid fraction which is obtained on mixing the first two components need not be separated and, if desired, may remain in the catalyst but this is less preferred because it increases the amount of catalyst residue in the product without corresponding advantages. In a particularly preferred method, the cobalt salt-aluminum salt solution and the alkyl aluminum are not combined at all but are separately added to the reaction mixture. In the three-component catalyst, the mol ratio of the acidic metal halide to the cobalt or nickel salt is preferably greater during the catalyst preparation than in the final catalyst. In the preferred catalysts, the acidic metal halide is finally present in a two to five fold molar excess over the cobalt or nickel salt. Cobalt or nickel concentrations of the three-component catalyst are in the same range as those of the two-component catalyst. The alkyl aluminum compound may be present in any amount in excess of 0 mols and supply some improvement in the reaction condition and product. The ratio of alkyl aluminum compound to cobalt or nickel salt is at least in part a function of the type of alkyl aluminum compound employed, and particularly its reducing strength. For example, trialkylaluminums, which are strong reducing agents, are suitably employed in ratios of 1 to 5 mols per atom of cobalt or nickel, while aluminum alkyl halides are used in higher concentrations, e.g., 25 to 200 mols per atom.

In the preparation of the two-component catalyst (c), formed from a cobalt or nickel compound and an organo aluminum co-catalyst, the catalyst again may be prepared simply by combining the catalyst components in a hydrocarbon diluent. The components may be added in any order but if a catalyst is to be prepared from an aluminum trialkyl it should be aged before being used. The aging may be conveniently accomplished by heating to temperatures up to the boiling point of the diluent and permitting the catalyst contained in the diluent to cool. Alternatively, aging may be accomplished by permitting the catalyst composition to stand for several hours at room temperature. In preparing the catalyst with an aluminum trialkyl it is preferred that the mol ratio of the cobalt or nickel halide to the organo aluminum compound be greater than 1. A minimum ratio of about 1.5:1 is especially preferred. Lower ratios may be employed when the aluminum compound is an alkyl aluminum halide. While there is no maximum which limits the operativeness of the catalyst, practical considerations establish a ratio of about 5:1 as a suitable upper limit. In the preferred embodiment the mol ratio of cobalt or nickel halide to aluminum trialkyl is approximately 3:1.

In all catalyst preparations the components are preferably employed in substantially pure anhydrous forms. Small concentrations of some impurities may, however, be tolerated in the catalyst components.

The catalysts may be added as such or in combination with a solid carrier, or in solvent solution. It is usually preferred to employ a solvent solution. Suitable solvents include benzene, toluene, xylene, cyclohexane, methylcyclohexane and the like.

The amount of the nickel or cobalt catalyst employed to catalyze the polymerization may vary. In general, only small amounts, e.g., amounts ranging from about $1 \times 10^{-6}$ to about $1 \times 10^{-4}$ atoms of nickel or cobalt per mol of the conjugated diene are very satisfactory. Expressed on a weight basis, amounts of 0.1 to 50 p.p.m. cobalt or nickel, based on the total reaction mixture, has been found useful, and 0.2 to 3 p.p.m. are especially preferred.

The temperature employed will depend upon the exact catalyst and solvent utilized. Temperatures generally range from about $-20°$ C. to about $100°$ C. Temperatures between $15°$ C. and $60°$ C. are particularly preferred as they are most convenient and generally give products having a somewhat higher proportion of the cis-1,4 addition product than is obtained at higher temperatures.

The process is conducted in an inert atmosphere. This is created by the system. This will vary depending upon tion zone with an inert gas. Suitable inert materials include nitrogen, methane, and the like.

The most convenient operating pressure is that which is created by the system. This will vary depending upon the specific nature of conjugated diene, the solvent and their respective amounts. Such pressures are termed "autogenic" pressures. If desired, higher or lower pressures may be employed.

The process is conducted under substantially anhydrous conditions which are achieved by carefully drying the reactants and the reaction vessel and maintaining the customary precautions during the reaction to keep water out of the reaction vessel. It is important to use extremely effective drying methods such as, for example, distillation or beds of molecular sieves, calcium hydride, or a combination of several drying methods to reduce the water content of all components to a value which is preferably no more than 1 part of water per million. This permits maintaining an accurately controlled concentration of water by adding sufficient water to maintain the desired concentration, generally in the range between 2 and 50 parts per million. Since this would usually involve adding extremely small quantities of water in a continuous or semi-continuous manner and providing for their distribution in a large reactant mass, it is generally preferred to add water in solution in a suitable hydrocarbon solvent, preferably benzene. Water is slightly soluble in benzene and a controlled amount of water can be readily added in the form of a solution in benzene containing, for example, 200 to 700 parts per million, i.e., 0.02 to 0.07% by volume, of water. When water is added in solution in one of the components of the total reaction mixture, e.g., the hydrocarbon solvent or the butadiene, it may also be possible to control the amount of water added by carefully drying the total stream or streams entering the reaction vessel only to the point at which the required amount of water is retained. Alternatively, a portion of the total feed may be completely dried to the lowest possible water content and another portion, having a somewhat higher water concentration, may be added in the controlled amount required to give the desired water concentration. These and other suitable methods of addition will be readily apparent to the persons skilled in the art.

One method of operation is that described in detail in Example V. In this method, dried solvent and aluminum alkyl are first combined, a controlled amount of water is then added, a solution of cobalt salt is added next, and, finally, butadiene is added to the resulting solution over a period of time.

A preferred method of operation is to prepare a solvent containing the desired, predetermined amount of water, add the catalyst thereto and introduce the monomer into the resulting mixture. It is particularly preferred to introduce the dry butadiene into the solvent-catalyst mixture over a period of time. External or internal (evaporative) cooling is preferably applied to speed the rate of addition. In the preferred method of operation, the time required for the reaction will depend upon the rate of addition of monomer as well as the reaction temperature. At the preferred temperature of $15°$ C. to $60°$ C. with the addition of butadiene over a period of time, the polymerization can conveniently be carried out in from about 5 minutes to about 4 hours.

The reaction mixture is preferably agitated during the course of the reaction. This may be accomplished by mounting the reactor on a rocker or by use of suitable stirrers. Further, the reactor is preferably equipped with suitable inlets for feeding the monomer and a set of inlets and outlets for circulating an inert gas to purge air from the vessel. A separate inlet may be supplied whereby catalyst may be added during the course of the reaction. If continuous operations are to be employed then the inlet for catalyst and solvent is necessary as well as an outlet for the continuous withdrawal of polymer solution.

At the completion of the reaction, the mixture is treated to deactivate the metal catalyst. This suitably includes the addition of a proton donor, i.e., a material having active hydrogen, such as water, mineral or organic acids, mercaptans, alcohols, amines and the like. It can be accomplished by addition of a small amount of isopropyl alcohol, e.g., 0.1 to 2 percent by volume or more. A larger amount of the alcohol may then be added to coagulate the polymer.

The polymers prepared by the process of the invention may be utilized for many important industrial applications. The polymers may be used, for example, in the preparation of molded rubber articles, such as tires, belts, tubes and the like or may be added alone or with other polymeric materials to known rubber compositions to improve specific properties, such as resilience. The polymers of the invention may also be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients, such as, for example, tackifiers, plasticizers, stabilizers, vulcanizing agents, oils, carbon black and the like, and then heat to effect vulcanization. Preferred vulcanizing agents include, among others, sulfur, sulfur chloride, sulfur thiocyanate, thiuram polysulfides and other organic polysulfides. These agents are preferably used in amounts varying from about 0.1 part to 10 parts per 100 parts of rubber. Vulcanization temperatures preferably range from about $100°$ C. to about $175°$ C. Preferred temperatures range from about $125°$ C. to $175°$ C. for a period of 15 to 60 minutes.

To illustrate the manner in which the invention may be carried out, the following examples are given. It is to be understood, however, that the examples are for the purpose of illustration and the invention is not to be regarded as limited by any of the specific conditions cited therein.

In these examples, the microstructure of the polymer was determined by infrared analysis of a film prepared by evaporating a 1 percent solution of polymer in benzene to dryness in a salt plate in the aperture of a standard plate holder. The film was scanned in the infrared on a recording instrument. Using the absorbances at 10.35, 11.0 and 13.60 microns for trans-1,4, 1,2 and cis-1,4 unsaturation respectively, the total intensity was normalized. The iodine number of the polymer showed it to be substantially 100 percent polybutadiene.

*Example I*

This example illustrates the effect of added water in the range from 2 to 14 parts per million (p.p.m.) in the polymerization of butadiene in a benzene solvent, the catalyst being the reaction product of cobalt chloride, aluminum chloride and aluminum ethyl sesquichloride.

For this series of experiments the catalyst is prepared by mixing 3 grams of $CoCl_2$ and 10 grams of $AlCl_3$ in sufficient benzene to result in a total of 1,000 grams of mixture. The mixture is stirred and heated in a dry inert atmosphere at a temperature in the range between 25 and 80° C., preferably at about 70° C., for 4 to 5 hours. This results in a green solution which contains about 500 parts per million of cobalt and contains aluminum and cobalt in a molar ratio of about 3:1.

A series of experiments was carried out in the following manner: Dry deaerated benzene was placed in a dry glass flask and dry deaerated butadiene was bubbled into the benzene until a concentration of about 7% by weight of butadiene was achieved. At this point a sample of the solution was taken and analyzed for water content. If necessary to achieve a desired higher water content, additional water was added in the form of benzene containing in the range from 500 to 600 parts per million of water. Although the analysis for water content is believed to be quite accurate in the higher range of the experiments covered in this example, i.e., between 5 and 14 parts per million, it is possible that at the lower end of the range somewhat more water was actually present than was found by the careful Karl Fischer analysis carried out on the samples.

The required amount of aluminum ethyl sesquichloride was added to the flask in the form of a 10% by weight solution in benzene. In 1 to 2 minutes after the addition of the sesquichloride the required amount of the cobalt catalyst solution, prepared as described above, was added. The flask was stirred while being maintained at a temperature of 25° C. until a high degree of conversion of butadiene to polybutadiene had been obtained. Generally the reaction was stopped after about 60% of the butadiene present had been polymerized. The catalyst was deactivated by adding to the flash a solution of 10% isopropyl alcohol and 1% phenyl-beta-naphtylamine (PBNA) in benzene. The isopropyl alcohol serves to deactivate the catalyst and the PBNA to stabilize the polymer against oxidation. Polymer was recovered by driving off benzene by evaporation to dryness and was then analyzed for its cis-1,4 content by infrared analysis. The intrinsic viscosity (IV) of the polymer was determined in the conventional manner. The percent of conversion was determined by measuring the amount of solids produced. As a measure of the overall rate of reaction we use a term designated "reaction half time." This is an approximate value which indicates the time from initiation of the reaction until half the monomer present is converted to polymer. A short reaction half time indicates a high rate of reaction and vice versa. The mechanism of the polymerization in this process is believed to be complex, and the "reaction half time" is intended only as a practical indicator of the degree of conversion obtainable in a given time.

In the series of experiments of this example the amount of cobalt employed in the form of the above-described cobalt chloride-aluminum chloride complex was 2 parts of Co per million of reaction mixture. In addition the reaction mixture contained 175 parts per million of aluminum ethy sesquichloride. The results of a series of experiments carried out in the above-described manner are shown in Table 1.

TABLE 1

| Expt. No. | $H_2O$ in reaction mixture, p.p.m. | Reaction half time, minutes | Polymer structure | | | IV, dl./g. |
|---|---|---|---|---|---|---|
| | | | Cis-1,4, percent | Trans-1,4, percent | 1,2, percent | |
| I-1 | 2 | 10 | 96.6 | 1.5 | 1.9 | 2.0 |
| I-2 | 4 | 9 | 97.1 | 1.6 | 1.3 | 3.2 |
| I-3 | 5 | 10 | 98.5 | 1.0 | 0.5 | 4.6 |
| I-4 | 10 | 400 | 93.1 | 6.0 | 0.9 | 4.3 |
| I-5 | 14 | 550 | 88.8 | 9.6 | 1.6 | 3.1 |

These experiments show that even 2 parts per million of water was sufficient to result in a high reaction rate and that the rate decreased rapidly between 5 and 10 parts per million of water. When plotted as a graph, the point at which the rate begins to decrease rapidly is at about 6 or 7 parts per million. It is also apparent from the data that cis-1,4-polybutadiene content was satisfactory with as little as 2 parts per million of water, increased further at 4 and 5 parts per million of water but became unsatisfactorily low when the water content reached 10 and 14 parts per million. Lastly, the intrinsic viscosity of the polymer increased rapidly during the first part of the range, reaching a maximum at about 5 parts per million of water, and then commenced to decrease.

It is apparent from this series of experiments that the concentration of water which leads to satisfactory results in the particular system employed herein is in the range from about 2 to about 6 parts per million of water.

*Example II*

A further series of experiments was carried out, employing a catalyst prepared in the same manner as in Example I but employing a large reaction mass (ca. 1.5 liter) and employing as solvent a mixture of benzene and butene-1. The reaction mixture contained 1p.p.m. cobalt and 250 p.p.m. aluminum ethyl sesquichloride. The concentration of the several reagents as well as the structure and intrinsic viscosity of the resulting product are given in Table 2. In this example each experiment represents the average result of two separate runs. In experiment II-1, no water analysis was made and no water was added. In II-2, the amount of water was determined by analyzing the separate reagents for water content; additional water was added in benzene solution. The actual water content may therefore have been somewhat higher due, for example, to water entering by virtue of adhering to the reactor walls.

TABLE 2

| Expt. No. | Reaction mixture | | | | Polymer structure | | | IV, dl./g. |
|---|---|---|---|---|---|---|---|---|
| | Butadiene, percent weight | Benzene, percent weight | Butene-1, percent weight | $H_2O$, p.p.m. | Cis-1,4, percent | Trans-1,4, percent | 1,2, percent | |
| II-1 | 10 | 9 | 81 | [1] 1-5 | 94.1 | 2.8 | 3.1 | |
| II-2 | 13 | 9 | 78 | [2] 10 | 97.5 | 1.5 | 1.0 | 1.0 |

[1] Estimated—no water deliberately added.
[2] 8.5 p.p.m. in feed—1.5 p.p.m. deliberately added.

It is seen that in the absence of added water the cis-1,4 content of the product was 94.1 and with a total of at least about 10 parts per million of water the cis-1,4 content was 97.5.

Example III

In this example the reaction system was very similar to that of Example II. The solvent again consisted of a mixture of benzene and butene-1, but the butadiene concentration was in the range of 22% rather than 10 to 13%.

A further difference is that in experiments III-3, III-4 and III-5 the water content of the reaction mixture was determined after all reagents except the catalyst had been added to the reactor. These results are, therefore, more precise with respect to analysis of water content. The concentrations of reagents, cis-1,4 content of the polybutadiene product and intrinsic vicosity of the polybutadiene product are given in Table 3.

TABLE 3

| | Reaction mixture | | | | Polymer structure | | | |
|---|---|---|---|---|---|---|---|---|
| Expt. No. | Buta-diene, percent weight | Benzene, percent weight | Butene-1, percent weight | $H_2O$, p.p.m. | Cis-1,4, percent | Trans-1,4, percent | 1,2, percent | IV, dl./g. |
| III-1 | 22 | 10 | 68 | [1] 1-5 | 96.7 | 1.4 | 1.9 | 1.2 |
| III-2 | 22 | 10 | 68 | [2] 4-8 | 97.4 | 1.4 | 1.2 | 1.6 |
| III-3 | 22 | 10 | 68 | [3] 8 | 98.3 | 0.9 | 0.8 | 2.9 |
| III-4 | 22 | 10 | 68 | [3] 20 | 97.4 | 1.5 | 1.1 | 2.2 |
| III-5 | 19.5 | 10 | 70.5 | [3] 30 | 96.9 | 1.5 | 1.6 | 1.8 |

[1] Estimated—no water deliberately added.
[2] Estimated: 3 p.p.m. water added.
[3] By analysis of total mixture before catalyst addition.

These data indicate that the amount of water that is tolerated in this particular reaction system is greater than that in the system of Example I. Thus, even with 30 parts per million of water a product of satisfactory cis-1,4 content is still produced although the highest cis-1,4 contents are observed with about 8 parts per million of water. At that same water content (ca. 8 p.p.m.) the highest intrinsic viscosity is also produced. This is, however, still in the range which is useful for commercial utilization of polybutadiene.

Example IV

This example illustrates, inter alia, the fact that the effect of water in the polymerization of butadiene is unique, and is not observed where using equivalent amounts of other polar substances.

The catalyst employed in this example was prepared approximately in the same manner as that in Example I, modified mainly in that the mixture of $CoCl_2$, $AlCl_3$ and benzene was heated at reflux temperature. The reaction was carried out by placing in a flask 50 cc. of dry deaerated benzene, adding thereto water or methanol or acetic acid in solution in benzene, then sufficient aluminum ethyl sesquichloride to be present in the concentration of about 200 parts per million and then the cobalt chloride-aluminum chloride reatcion product in solution is sufficient amount to add 2 parts per million of cobalt to the reaction mixture. The mixture was then allowed to stand for 20 minutes before butadiene of special purity was added in sufficient amount to be present in a concentration of about 15% by weight.

The concentration of the several additives employed and the resulting cis-1,4 content of the polybutadiene produced are presented in Table 4.

TABLE 4

| | Compound added | | | | Polymer structure | | |
|---|---|---|---|---|---|---|---|
| Expt. No. | $H_2O$ | | $CH_3OH$, moles per mole $CoCl_2$ | $CH_3COOH$, moles per mole $ClCo_2$ | Cis-1,4, percent | Trans-1,4, percent | 1,2, percent |
| | P.p.m. | Moles per mole $CoCl_2$ | | | | | |
| IV-1 | | | | | 92 | 1.7 | 6.3 |
| IV-2 | 4 | 8.6 | | | 98.5 | 0.8 | 0.7 |
| IV-3 | | | 7.2 | | 93.0 | 1.5 | 5.5 |
| IV-4 | | | 29 | | 93.4 | 1.8 | 4.8 |
| IV-5 | 4 | 8.6 | 15 | | 98.5 | 0.7 | 0.8 |
| IV-6 | | | | 4 | 93.0 | 1.9 | 5.1 |
| IV-7 | | | | 8 | 90.6 | 2.2 | 7.2 |
| IV-8 | 4 | 8.6 | | 4 | 98.6 | 0.7 | 0.7 |

The above experiments were carried out in somewhat different equipment from that employed in Examples I to III. It was possible to dry the ingredients more carefully and prevent access of moisture more carefully so that a drier reaction system could be produced than was possible in the previous examples. It is clearly evident from experiments IV-1, 3, 4, 6 and 7 of Table 4 that in the absence of any added water the cis-1,4 content of the product was substantially below 95%. Even though methanol or acetic acid were added in concentrations which are molar equivalents, or more, of the amount of water which is effective for increasing the cis-1,4 content, these other polar compounds exerted no noticeable effect on the cis-1,4 content of polybutadiene. However, when water was added together with the other materials it effected a good increase in the cis-1,4 content of the product. The presence of the other polar substances therefore was neither of beneficial nor of detrimental effect insofar as these results are concerned.

Example V

This example illustrates the application of this invention in the production of polybutadiene on a semi-commercial scale. The reactor is a 100 gallon vessel provided with a suitable stirrer. The reactor is dried as completely as possible by circulating dry benzene therethrough, followed by a solution of aluminum ethyl sesquichloride.

The benzene solvent and the butadiene employed are freed of impurities and are separately dried to a water content of no more than 1 part per million of water by passing them in series through beds of sodium hydroxide supported on asbestos, anhydrous calcium sulfate and zeolytic calcium aluminum silicate which is commercially available from Linde Chemical Company as 13X molecular sieve.

The catalyst is a reaction product of $CoCl_2$ and $AlCl_3$ dissolved in benzene. The proportions and method of preparation are substantially the same as described in Example I but the solids are maintained in contact with the solution for a longer period of time and consequently the concentration of cobalt in the final catalyst is in the range from 1,000 to 2,000 parts per million.

Aluminum ethyl sesquichloride is obtained as a commercial product and dissolved in benzene to provide a solution of about 5% concentration.

The production of polybutadiene was carried out in the above-described reactor and with the above-described reagents in a series of successive batch runs. Typically, about 900 lbs. of benzene is placed in the reactor and sufficient aluminum ethyl sesquichloride is added in the form of benzene solution to provide a final concentration based on the total reaction mixture of 200 parts per million. A predetermined amount of water, generally 2 to 4 parts per million, is then added in the form of a benzene solution containing about 300 parts per million of water. Sufficient catalyst solution is then added to provide 1 part per million cobalt based on the total reaction mixture. Immediately after the addition of the cobalt catalyst, flow of butadiene to the reactor is commenced and butadiene is added at a rate of about 20 pounds per hour during a four hour period. The reactor is stirred and maintained at the lowest practical temperature in the range of 15 to 35° C. during the period of butadiene addition and for an additional 4 to 5 hours. The catalyst is then deactivated and polymer is recovered by removing solvent from the resulting polymer solution.

In the series of experiments carried out in this manner it was found that with a relatively clean reactor the best results were obtained when adding two to four parts per million of water. The results of failure to have sufficient water present is illustrated for example in a series of seven successive runs, carried out as described except for the addition of water, in which the reaction vessel was not opened after the reactant solution had been removed therefrom and before the benzene was added for the next run. In each of these runs the cis-1,4 content of the product was between 92.7 and 95.2 and the reaction rate was such that no substantial conversion could be obtained. The reactor was then cleaned by streaming it out to remove adhering gel and drying it in the above-described manner. The first run following this cleaning resulted in a product of 97.3% cis content which was produced at a satisfactory rate. The second run proceeded at a very low rate and resulted in a product of 93.2% cis content. In the next following runs about 2 to 4 parts per million of water was added in the above-described manner and the resulting products were again produced at a satisfactory rate and had a cis content of 96.8% and higher. This illustrates that even after careful drying sufficient water adhered to the reactor to provide the required amount for activation of the catalyst but that subsequent batches could not be polymerized effectively unless an amount of water in the critical range was added thereto.

In a series of experiments carried out in the manner of Example V, but with a reactor which had been in use for a number of runs without intermediate cleaning and had consequently acquired some gelled polybutadiene adhering to the reactor surfaces, it was found that when water was added to the reaction system subsequent to the addition of aluminum ethyl sesquichloride the effect of the given amount of water was greater than when water was added before the aluminum ethyl sesquichloride. However, satisfactory results could be obtained with either method or water addition.

It was also found with such a "dirty" reactor that the amount of water addition which was required for satisfactory results increased somewhat, particularly if the water was added prior to the addition of aluminum ethyl sesquichloride. For example, 12 parts per million of water could be added prior to the aluminum ethyl sesquichloride and products of satisfactory structure and intrinsic viscosity produced although at a somewhat lower than usual rate. If 12 parts per million of water were added subsequent to the addition of aluminum ethyl sesquichloride the product had an excessively high intrinsic viscosity.

We claim as our invention:

1. A process for producing polybutadiene containing at least 95% cis-1,4 structure which comprises polymerizing 1,3-butadiene at a temperature in the range from —40° to 150° C. in a hydrocarbon solution containing as catalyst the hydrocarbon soluble reaction product of a compound of a heavy metal selected from the group cobalt and nickel in their divalent state with an organo-aluminum compound, in an amount of 0.1 to 50 p.p.m. of heavy metal, while controlling the total amount of water present in the reaction mixture to a predetermined value effective to modify the catalytic properties of said solution to maintain a relatively high polymerization reaction rate and a polymerization reaction which results in a cis-1,4 content substantially in excess of that obtained by employing a substantially lower or a substantially higher amount of water.

2. A process for producing polybutadiene containing at least 95% cis-1,4 structure which comprises polymerizing 1,3-butadiene at a temperature in the range from —40° to 150° C. in a hydrocarbon solution containing as catalyst the hydrocarbon soluble reaction product of a compound from the group consisting of divalent nickel and cobalt halides and nitrates in an amount providing 0.1 to 50 p.p.m. of said metal and a co-catalyst selected from the group consisting of (a) aluminum halides (b) combinations of aluminum halides and aluminum alkyl compounds, and (c) organo-aluminum compounds while controlling the total amount of water present in the reaction mixture to a predetermined value effective to modify the catalytic properties of said solution to maintain a relatively high polymerization reaction rate and a polymerization reaction which results in a cis-1,4 content substantially in excess of that obtained by employing a substantially lower or a substantially higher amount of water.

3. A process according to claim 2 in which said solution contains as catalytic ingredients and co-catalyst cobalt chloride, aluminum chloride and an aluminum alkyl compound.

4. A process according to claim 3 in which said aluminum alkyl compound is selected from the group consisting of trialkyl aluminum having from 2 to 8 carbon atoms per alkyl group, aluminum diethyl chloride, aluminum ethyl dichloride and aluminum ethyl sesquichloride.

5. A process according to claim 2 in which said solution contains as catalytic ingredient and co-catalyst cobalt chloride and an aluminum alkyl compound, respectively.

6. A process according to claim 5 in which said aluminum alkyl is selected from the group consisting of trialkyl aluminum having from 2 to 8 carbon atoms per alkyl group, aluminum diethyl chloride, aluminum ethyl dichloride and aluminum ethyl sesquichloride.

7. A process for producing polybutadiene containing at least 96% cis-1,4 structure which comprises polymerizing 1,3-butadiene at a temperature in the range from —40° to 150° C. in a hydrocarbon solution containing at least 8 percent by weight benzene, sufficient to maintain the polybutadiene product in solution, and containing as catalyst the reaction product of cobaltous chloride, aluminum chloride and aluminum ethyl sesquichloride in an amount of 0.1 to 50 p.p.m. of cobalt, 1.5 to 5 parts by weight of $AlCl_3$ per part of cobalt and 5 to 150 parts by weight of $Al_2(C_2H_5)_3Cl_3$ per part of cobalt, while controlling the total amount of water present in the reaction mixture to a value in the range from about 2 to about 50 parts per million of said mixture, effective to modify the catalytic properties of said solution to maintain a relatively high polymerization reaction rate and a polymerizaiton reaction which results in a cis-1,4 content substantially in excess of that obtained by employing a substantially lower or a substantially higher amount of water.

8. A process according to claim 7 in which said hydrocarbon solution consists essentially of benzene and said amount of water is in the range from 2 to 15 parts per million.

9. A process according to claim 7 in which said hydrocarbon solution consists of benzene and normal butene and said amount of water is in the range from 2 to 30 parts per million.

10. A process for producing polybutadiene containing at least 95% cis-1,4 structure which comprises polymerizing 1,3-butadiene at a temperature in the range from $-40°$ to $150°$ C. in a hydrocarbon solution containing as catalyst the hydrocarbon soluble reaction product of a compound of a metal selected from the group cobalt and nickel in their divalent state in an amount providing 0.1 to 50 p.p.m. of said metal and a cocatalyst comprising the combination of aluminum halide and aluminum alkyl compounds while controlling the total amount of water present in the reaction mixture to a value in the range from about 2 to about 50 parts per million of said mixture, effective to modify the catalytic properties of said solution to maintain a relatively high polymerization reactions rate and a polymerization reaction which results in a cis-1,4 content substantially in excess of that obtained by employing a substantially lower or a substantially higher amount of water.

11. A process for producing polybutadiene containing at least 95% cis-1,4 structure which comprises polymerizing 1,3-butadiene at a temperature in the range from $-40°$ to $150°$ C. in a hydrocarbon solution containing as catalyst the hydrocarbon soluble reaction product of a compound of a metal selected from the group cobalt and nickel in their divalent state in an amount providing 0.1 to 50 p.p.m. of said metal with an aluminum alkyl compound while controlling the total amount of water present in the reaction mixture to a value in the range from about 2 to about 50 parts per million of said mixture, effective to modify the catalytic properties of said solution to maintain a relatively high polymerization reaction rate and a polymerization reaction which results in a cis-1,4 content substantially in excess of that obtained by employing a substantially lower or a substantially higher amount of water.

12. A process for producing polybutadiene containing at least 95% cis-1,4 structure which comprises preparing a hydrocarbon solution containing as catalyst the hydrocarbon soluble reaction product of a compound of a heavy metal selected from the group cobalt and nickel in their divalent state with an organo-aluminum compound in an amount of 0.1 to 50 p.p.m. of heavy metal, said solution being prepared from ingredients carefully dried to provide no more than about 1 p.p.m. of water in the solution, and from a carefully controlled stream containing a predetermined amount of water in the range from about 2 to 50 p.p.m., based on the resulting solution, maintaining the solution at polymerization conditions, including a temperature in the range from $-40°$ to $100°$ C., and introducing dry 1,3-butadiene into said solution, whereby polybutadiene having in excess of 95% cis-1,4 structure is produced in said solution.

References Cited in the file of this patent
UNITED STATES PATENTS

| | | |
|---|---|---|
| 2,781,410 | Ziegler | Feb. 12, 1957 |
| 2,839,518 | Brebner | June 17, 1958 |
| 2,871,276 | Eiszner | Jan. 27, 1959 |
| 2,905,659 | Miller | Sept. 22, 1959 |
| 2,924,579 | Young | Feb. 9, 1960 |
| 2,953,556 | Wolfe | Sept. 20, 1960 |

FOREIGN PATENTS

| | | |
|---|---|---|
| 534,792 | Belgium | May 1, 1955 |
| 779,111 | Great Britain | July 17, 1957 |
| 781,837 | Great Britain | Aug. 28, 1957 |
| 783,487 | Great Britain | Sept. 25, 1957 |
| 785,314 | Great Britain | Oct. 23, 1957 |
| 815,310 | Great Britain | June 24, 1959 |
| 1,022,382 | Germany | Jan. 9, 1958 |
| 1,175,201 | France | Nov. 10, 1958 |